(12) United States Patent
Hsu

(10) Patent No.: US 8,704,137 B2
(45) Date of Patent: Apr. 22, 2014

(54) PROCESS FOR WELDING ELECTRICAL CONNECTORS AND WELDING DEVICE THEREOF

(76) Inventor: Ching-Jen Hsu, Guangdong (CN)

( * ) Notice: Subject to any disclaimer, the term of this patent is extended or adjusted under 35 U.S.C. 154(b) by 1461 days.

(21) Appl. No.: 12/236,689

(22) Filed: Sep. 24, 2008

(65) Prior Publication Data

US 2010/0006553 A1 Jan. 14, 2010

(30) Foreign Application Priority Data

Jul. 11, 2008 (CN) .......................... 2008 1 0029380

(51) Int. Cl.
| | | |
|---|---|---|
| *B23K 11/00* | (2006.01) | |
| *B23K 1/002* | (2006.01) | |
| *B23K 26/00* | (2006.01) | |
| *B23K 1/00* | (2006.01) | |
| *A21B 1/00* | (2006.01) | |
| *F27B 9/06* | (2006.01) | |

(52) U.S. Cl.
USPC .... 219/148; 219/85.1; 219/85.12; 219/85.13; 219/411; 219/388; 228/179.1; 228/248.1; 228/33; 228/41; 228/56.1; 392/411; 392/424

(58) Field of Classification Search
USPC .......... 219/85.12, 85.13, 603, 605, 616, 635, 219/638, 85.1, 85.2, 85.21, 78.02, 79, 80, 219/87, 209, 388, 411, 460.1, 561.1, 463.1, 219/464.1, 465.1, 466.1, 467.1, 468.1, 219/468.2, 400; 392/411, 424; 228/179.1–180.22, 248.1–248.5, 33, 228/41, 56.1–56.2, 9; 362/147, 217, 362/221–222, 260, 265
See application file for complete search history.

(56) References Cited

U.S. PATENT DOCUMENTS

| | | | | |
|---|---|---|---|---|
| 3,529,117 | A * | 9/1970 | Costello | 219/85.12 |
| 3,569,607 | A * | 3/1971 | Martyak et al. | 174/254 |
| 3,619,324 | A * | 11/1971 | Sato et al. | 156/384 |
| 4,565,917 | A * | 1/1986 | Furtek | 219/388 |
| 4,654,502 | A * | 3/1987 | Furtek | 219/85.13 |
| 4,725,716 | A * | 2/1988 | Entwistle et al. | 219/388 |
| 4,785,156 | A * | 11/1988 | Benko et al. | 219/121.64 |
| 4,812,620 | A * | 3/1989 | Hayakawa et al. | 392/421 |
| 4,833,301 | A * | 5/1989 | Furtek | 219/388 |
| 4,876,437 | A * | 10/1989 | Kondo | 219/388 |
| 4,979,290 | A * | 12/1990 | Chiba | 29/840 |
| 5,032,703 | A * | 7/1991 | Henschen et al. | 219/85.22 |
| 5,060,288 | A * | 10/1991 | Spigarelli et al. | 392/412 |

(Continued)

*Primary Examiner* — Dana Ross
*Assistant Examiner* — Gyounghyun Bae
(74) *Attorney, Agent, or Firm* — Global IP Services; Tianhua Gu

(57) ABSTRACT

This invention introduces the welding technology of an electrical connector and its welding device. The welding device comprises of a base frame, IR lamp that can emit infrared rays, and convex lens used to collect infrared rays. The lamp and lens are set in the base frame, with the convex lens in front, which collects all infrared rays from the lamp and irradiates them to the solder paste, allowing for fast heating. The melted solder paste forms defect-free welding spots with sound electrics performance and low energy consumption, thus saving energy. This invention of welding device is used for the welding when electrical connector is assembled, solder paste is put and the connector is fixed in the conveying belt. The electrical connector goes through the heating zone in welding device, which enables the automatic welding of each cored wire in the electrical connector and wire connecting terminal. The welding is fast and the production can be continuous free of any tack welding. The process has low energy consumption and saves energy.

2 Claims, 3 Drawing Sheets

(56) References Cited

U.S. PATENT DOCUMENTS

| | | | |
|---|---|---|---|
| 5,122,635 A * | 6/1992 | Knodler et al. | 219/121.63 |
| 5,227,596 A * | 7/1993 | McGaffigan et al. | 219/616 |
| 5,278,938 A * | 1/1994 | Spigarelli et al. | 392/420 |
| 5,305,944 A * | 4/1994 | Yoshida et al. | 228/180.22 |
| 5,580,158 A * | 12/1996 | Aubrey et al. | 362/640 |
| 5,659,657 A * | 8/1997 | Overdorf | 392/422 |
| 5,683,518 A * | 11/1997 | Moore et al. | 118/730 |
| 6,005,223 A * | 12/1999 | Ogihara | 219/388 |
| 6,102,550 A * | 8/2000 | Edwards, Jr. | 362/221 |
| 6,168,064 B1 * | 1/2001 | Berkin | 228/9 |
| 6,642,485 B2 * | 11/2003 | Goenka et al. | 219/400 |
| 6,732,911 B2 * | 5/2004 | Matsuki et al. | 228/219 |
| 6,768,083 B2 * | 7/2004 | Rae et al. | 219/388 |
| 6,857,550 B2 * | 2/2005 | Wright et al. | 228/4.5 |
| 6,945,671 B1 * | 9/2005 | Swarens et al. | 362/233 |
| 6,998,580 B2 * | 2/2006 | Kusuda et al. | 219/411 |
| 7,026,582 B2 * | 4/2006 | Goenka et al. | 219/400 |
| 7,156,279 B2 * | 1/2007 | Goenke et al. | 228/46 |
| 7,316,062 B2 * | 1/2008 | Chilcote | 29/843 |
| 2003/0085216 A1 * | 5/2003 | Richert et al. | 219/388 |
| 2006/0152921 A1 * | 7/2006 | Welker | 362/147 |

* cited by examiner

PROCESS FOR WELDING ELECTRICAL CONNECTORS AND WELDING DEVICE THEREOF

CROSS REFERENCE TO THE RELATED PATENT APPLICATION

This application claims the priority of the Chinese patent application No. 200810029380.6 filed on Jul. 11, 2008, which is incorporated herein by reference.

FIELD OF THE INVENTION

This invention touches upon welding technology and welding equipment technology, especially the welding technology and welding device that use infrared rays to heat up solder paste.

BACKGROUND OF THE INVENTION

The multimedia interfaces, such as HDMI/Micro USB/Display port/UDI, of various electrical connectors are high frequency interfaces in the industry. HDMI can provide data transfer bandwidth as high as 10.2 Gbps, Micro USB 5.1 Gbps, and UDI even higher: 21 Gpbs. HDMI can transfer uncompressed audio messages and HD video signals, and does not need to have D/A or A/D switch before signal delivery, which can guarantee the high quality of audio and visual signals.

However, the interfacing internal core wire and the terminal is welded manually, one core wire welded each time. The efficiency is low, the quality is not steady, and the tin spots emerged from welding vary in size. Also, the spacing between the wire connecting terminals in the interface is too narrow, so it is hard to weld them and electrical connectors' short circuit and housing scalding can occur easily. The high-frequency transfer performance of the electrical connector is not steady and the yield rate is low.

A Chinese patent of a High Definition Digital Interface and its Processing Technology, Publication Patent Number being CN1841857, offers a technology of automatically welding the electrical connector. The steps are as this: assemble the electrical connector first, smear the solder paste, and then place the connector in the wire fixture, and heat up the wire fixture. As the wire fixture temperature rises, the solder paste melts, and the core wire is automatically welded with the corresponding wire connecting terminals in the electrical connector. However, the wire fixture transfers the heat in a low speed and it is low in processing efficiency. The welding effect is not satisfactory. It is needed to heat up the whole wire fixture for the welding, which consumes a large amount of energy, thus resulting in high production costs. It cannot meet the current demand for energy saving, nor can it sustain continuous production or high production efficiency.

Another Chinese patent of Processing Technology of High Definition Digital Interface, with Publication Patent Number of CN1976421, proposes a brand-new automatic welding process. The applicant also provides an automatic welding machine, through which the electrical connector can be welded automatically. In this process, the electrical connector is assembled first, and the solder paste is smeared in the wire connecting terminal, and then a C-shaped retaining clip is used to clamp each core wire, afterwards, set the electrical connector on the fixture of supply belt. The belt delivers all electrical connectors pending for welding in the automatic welding zone. A lamp able to emit heating light is set in the automatic welding zone of the automatic welding machine. The heating light radiates through a slot from the automatic welding machine, shining on the wire connecting terminal in the electrical connector, which melt the solder paste. The melted solder paste connects the core wire with its corresponding wire connecting terminal. However, the rays from the lamp, i.e.: infrared rays 72, are scattering. To avoid the rays from heating up unnecessary areas other than the electrical connector, the automatic welding machine obstructs the infrared rays from coming in, set with a beam stopper to absorb the infrared rays. A small slot is reserved in the beam stopper to allow for part of the rays to shine in. Most of the rays shine on the stopper whose purpose is only to form that slot, and it wastes most energy.

Since only a small portion of infrared rays emitted from the lamp shine through the slot, there is even a smaller portion of rays shining on the solder paste. The rays are severely insufficient. Thus, the heating period must be prolonged to make up for it. There are also the following disadvantages to this process:

(1), The heating by infrared rays during the irradiation is not even, and the heat exposure of solder paste is not even, which can result in bad solder paste melting and some tin balls in the tin spots, lowering the electric performance of welding spots.

(2), Welding spots on two sides of the electrical connector are, in particular, affected by the uneven heating. Due to the scarce heating on both sides of the connector, bad melting, tack welding in particular, can easily occur.

(3), During this welding process, the solder paste is slowly heated up till melting and then cools down and become solidified slowly, which can cause defects of various kinds in the internal structure of the welding spots formed by solder paste. Water, either in large amount or not, is unavoidable within the solder paste. Without drying out the water within, air cavities may appear in the welding spots when welding is completed. This can cause great resistance, poor electric performance and even tack welding to the welding spots.

(4), The automatic welding machine heats up slowly. The metallic clips and core wires absorb heat fast and their temperature is high. It can easily scald the housing and the core wires.

(5), The infrared rays are not concentrated. The section that needs heating cannot receive sufficient infrared rays. For example, the solder paste in the solder cup is not heated sufficiently. Nevertheless, other zones that do not need heating receive the infrared rays, such as the housing. Heated by infrared rays, the housing melts which affects the quality and outlook of the electrical connector and produces defective products easily.

SUMMARY OF THE INVENTION

Specific to the deficiency of existing technologies, this invention aims to provide a new welding process for the electrical connector, with high welding speed and no tack welding and tin melting. It can sustain continuous production and save energy.

It also targets at offering a new welding device, which collects the infrared rays emitted by IR lamp and irradiates them on the solder paste. The heating is rapid. The melted solder paste forms non-defective welding spots. The welding spots has fine electric performance, with low energy consumption and energy saving.

To achieve the above aims, the following steps for the welding process in this invention are included:

((1), assembling Electrical connectors: install each of the electrical connectors in place and place the cored wire of each electrical connector in a corresponding solder cup;

(2), smearing solder paste: smear the solder paste on insides of the solder cups of the electrical connectors;

(3), delivering: set the electrical connectors on a conveying belt for delivery;

(4) automatic welding: the conveying belt delivers the electrical connectors to a heating zone of automatic welding, infrared rays from a IR lamp which is installed in a welding device irradiate at the solder cup of the electrical connector;

(5), Forming welding spots: the conveying belt brings the electrical connector off the heating zone of automatic welding, the solder paste cools down to form a welding spot, which weld the cored wire with a corresponding wire connecting terminal.

In Step (4) mentioned above, a convex lens is set between the IR lamp and the electrical connector, the convex lens concentrates infrared rays from the IR lamp in the solder cup of the electrical connector, thereby the solder paste is melted evenly and quickly.

The welding device in this invention includes:
a base frame for installing parts of the welding device;
an IR lamp installed on the base frame for emitting infrared rays to heat a solder paste attached on the electrical connectors being welded;
a convex lens, which is installed before the IR lamp on the base frame, the convex lens focuses the infrared rays from IR lamp at the solder paste attached on the connector parts and makes the solder paste to be melted evenly and quickly.

Another welding device in this invention includes:
a base frame for installing parts of the welding device;
an IR lamp installed on the base frame for emitting infrared rays to heat a solder paste attached on the electrical connectors being welded;
a convex lens, which is installed before the IR lamp on the base frame, the convex lens focuses the infrared rays from IR lamp at the solder paste attached on the connector parts and makes the solder paste to be melted evenly and quickly.

The spacing adjustment structure between the IR lamp and the convex lens aims to adjust the distance between IR lamp and the convex lens and to keep this distance exceeding the lens' focal length.

This invention has beneficial results. Through the gathering of infrared rays and their concentrated irradiation on the components pending for welding, the heat is focused and the welding is fast. The melted solder paste can form defect-free welding spots with sound electric performance. It can sustain continuous production and no tin melting and tack welding will occur, and it can save energy.

BRIEF DESCRIPTION OF THE DRAWINGS

Further illustration to this invention is given with the attached drawings.

DETAIL DESCRIPTION OF THE INVENTION

Figure 1:
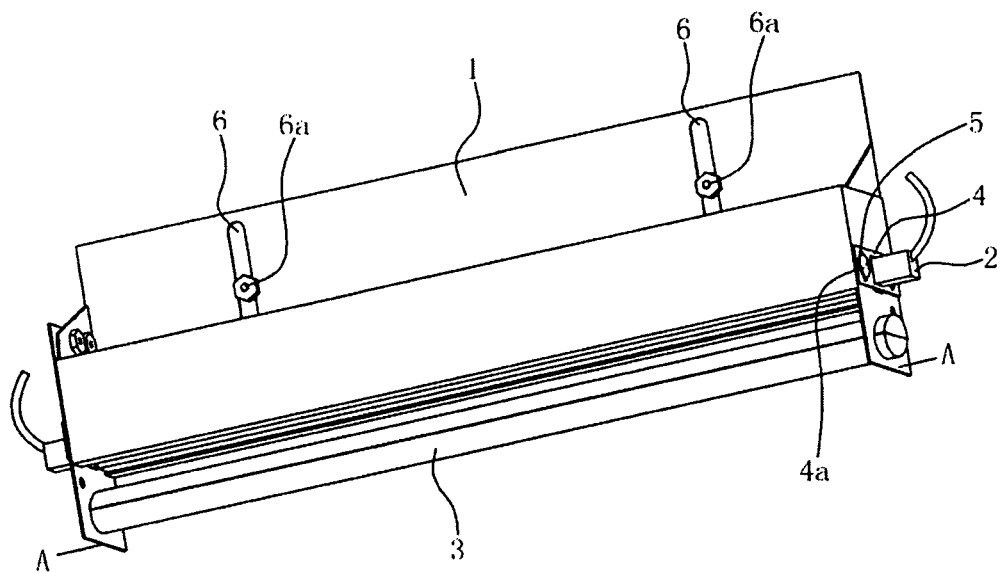
FIG. 1 is the structural sketch.
Figure 2:
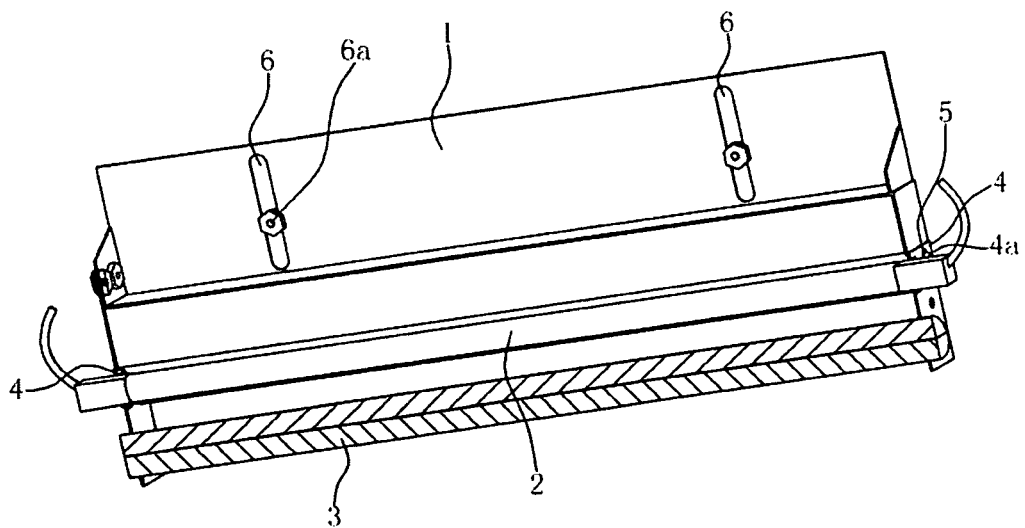
FIG. 2 is the sketch after it is sectioned in A-A direction.
Figure 3:
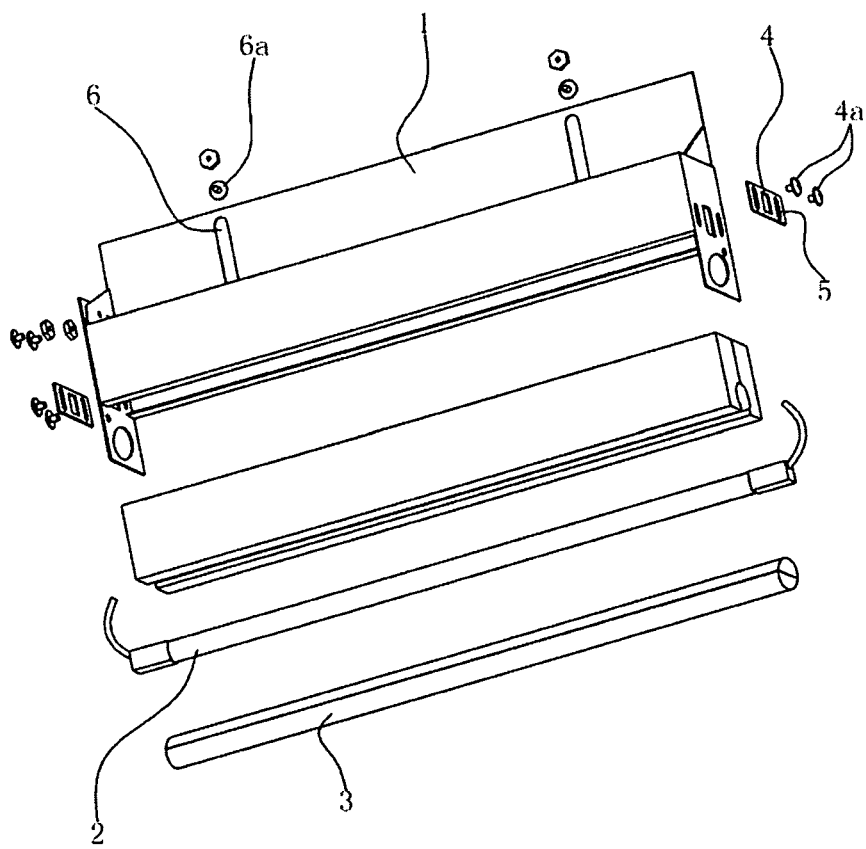
FIG. 3 is the breakdown drawing of welding device.

As shown in attached FIGS. 1 to 3, the welding device in this invention include: Base Frame 1, Lamp 2 that emits infrared rays and Convex Lens 3 that collects the infrared rays. Lamp 2 is set in Base Frame 1. Convex Lens 3 is set on Base Frame 2, the first being below Lamp 2. In order to have sound collection by Convex Lens 3, in this execution mode, Convex Lens 3 is right below Lamp 2. The infrared rays from Lamp 2 shine on Convex Lens 3 first. Collected by Convex Lens 3, the infrared rays go through Convex Lens 3 and shine in, focused in heat.

In order to have more concentrated infrared rays shining in, irradiating on the solder paste and more focused heating, higher heating temperature to allow for faster temperature increase and shorter welding time, the distance between Lamp 2 and Convex Lens 3 in this example is equal to or larger than the focal length of Convex Lens 3. Convex Lens 3 can collect rays well and the rays that go through it become more concentrated. The solder paste is heated evenly, free of tin melting and tin balls in the welding spots, which all guarantee the electric performance of welding spots. In addition, with more concentrated infrared rays, the heating on both sides of electric connector is more even. The heat absorbed by both sides and the mid section of the electrical connector is substantially the same; there will not be the bad phenomena of tin melting occurring. Thanks to the concentrated infrared rays, the infrared rays will not heat up the equipment or other area in the electrical connector, thus avoiding the housing melting and guaranteeing the quality of electrical connector.

The distance between Lamp 2 and Convex Lens 3 can also be less than the focal length of Convex Lens 3, only with the ray collecting effect not as good as that when Lamp 2 is beyond the focal length.

There is a reflecting plane plated in the internal surface of upper-half Lamp 2. The reflecting plane can be gold-plated or silver-plated. Gold-plated reflecting surface has higher melting point to sustain higher temperature. If the welding temperature is high, gold-plated reflecting surface is more suitable in this case. It is all natural to use reflecting surfaces of other materials or types as long as it can reflect the infrared rays. The infrared rays shining on the reflecting surface is reflected to the below of Lamp 2 to have all reflected rays from Lamp 2 to form multiple parallel rays of light that irradiate on Convex Lens 3 with better concentration effect and increased utilization of the infrared rays from Lamp 2. The reflecting rays can also utilize the infrared rays emitted to the upper half from Lamp 2 to further use its rays, to enhance energy efficiency and reduce production cost. Hence, it is not necessary to use a Lamp 2 with a high capacity, and those with lower capacity will do to meet the requirement of energy saving and low consumption.

The two ends of Lamp 2 are set on Position Adjustment Board 4, where there is a Straight Channel 5. Two Screws 4a go through the corresponding Straight Channel 5 to connect with Base Frame 1 to set Position Adjustment Board 4 on Base Frame 1. The distance between Lamp 2 and Convex Lens 3 can be adjusted by adjusting Position Adjustment Board 4 and Screws 4a to have Lamp 2 in the right position. Lamp 2 can be anywhere beyond the focal length of Convex Lens 3 to allow for most infrared rays to be concentrated below Convex Lens 3 with better effects and to utilize the infrared rays from Lamp 2 to the largest extent to heat up the solder paste. It is also feasible to adjust the position of Lamp 2 through other types of adjustment sets or devices, such as screw and screw rods. There can also be an adjustment device in Convex Lens 3 to adjust the lens' position.

There are two parallel Chutes 6 in Base Frame 1. There is also Screw 6a in Chute 6 to set Base Frame on the equipment. The up/down position of Base Frame 1 can be adjusted by loosening Screw 6a. After Base Frame 1 position is adjusted, Base Frame 1 can be set firmly on the equipment by tightening Screw 6a. The up/down position of Base Frame 1 can be adjusted by Chute 6 and Screw 6a to adjust the spacing between Convex Lens 3 and the electrical connector pending for welding and to have the optimal hot spot of concentrated infrared rays or the image of the IR lamp to fall within the solder cup of electrical connector.

The said Convex Lens 3 is in the long strip shape with oval cross section. The infrared rays from Lamp 2 gather as the linear light band after going through Convex Lens 3. The concentrated light band of infrared rays can accelerate the heating and melting of solder paste.

The irradiation of infrared rays is focused, the heating speed high and processing efficient. Meanwhile, the internal structure of welding spots formed by solder paste is better, free of tin balls and air cavities, while with better electric performance and no tack welding. The welding device can be produced non-stop in batch by way of conveying belt. Each electrical connector is delivered by conveying belt to make them move forward along the light band below Convex Lens 3. Adjusting the conveying belt speed can adjust the time Lamp 2 heats the solder paste in the electric connector. Also, this welding device is also applicable to the welding of multi-layer electrical components.

For sure, the cross section of mentioned Convex Lens 3 can also be half elliptic. Or, Convex Lens 3 is assembled from two strip-shape transmission lenses with half elliptic cross sections. The said Convex Lens 3 can be of other shapes. This invention does not limit the shape of Convex Lens 3 to be of oval cross section, nor limit it to be of long-strip shape, nor the quantity of Convex Lens 3. It is a better execution mode of this invention. It will do as long as it can collect the infrared rays.

Figure 4:
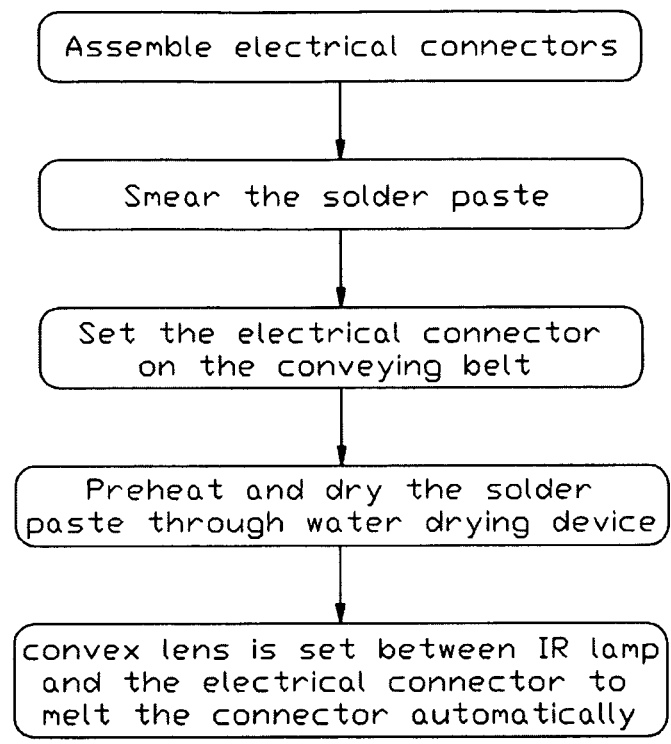
FIG. 4 is the welding process flow chart.

As shown in attached FIG. 4, the welding process of electrical connector in this invention includes the following steps:

(1) Electrical connector assembly: Assemble the electrical connector, installing each of its components pending for welding and placing each of its cored wires in the corresponding solder cups. The steps and methods are the same as existing technology.

(2), Wiping solder paste on: Smear the solder paste inside the solder cups of the electrical connector. The steps and methods are the same as existing technology.

(3) Delivery: Stabilize the electrical connector on the conveying belt for delivery. The steps and methods are the same as existing technology;

(4), Solder paste preheating: A water drying device is added before the welding device to preheat the solder paste before automatic welding, drying it and evaporating the water in it. The heating temperature in the water drying device is around 60~120 Celsius Degrees and the heating time is 5~15 seconds.

The mentioned water drying device can be the light drying device. This water drying device can serve as the welding device for this invention, and also be the heating device for the welding device when Convex Lens 3 is removed. The drying device dries up the water within solder paste without melting it in the preheating stage. During the subsequent welding process, the welding spots formed after the solder paste will not contain air cavities and their internal structure is free of defects and tin balls. There is little turn-on resistance. The welding spot electric performance is sound and there is no tack welding occurring.

(5), Automatic welding: The conveying belt delivers the electrical device to the below of Convex Lens 3. The distance between IR Lamp 2 and Convex Lens 3 equals or exceeds the focal length of Convex Lens 3. The electrical connector solder cup is in the imaging area of IR Lamp 2. The solder cup location can depend on the actual conditions, which is not restricted to the imaging area of Lamp 2. The infrared rays concentrated by Convex Lens 3 form a linear light band, along which the conveying belt advances with each electrical connector. This light band falls within the solder cup, that is, the collected and concentrated infrared rays through Convex Lens 3 irradiate within the solder cup of the electrical device to have it melting rapidly.

As the electrical connectors move out of the lighting zone, which is also the heating zone, cool the connectors rapidly by fanning or other methods that can achieve rapid cooling. The solder paste rapidly freezes and form welding spots to connect the core wire with corresponding wire connecting terminals in the electrical connectors.

IR Lamp 2 emits infrared rays with wave length less than 3 microns. The heating temperature of welding device is 150~250 Celsius Degrees and the heating period is 10~30 seconds.

With concentrated infrared rays, the welding device is heated evenly with high temperature. There will not be unfavorable tin melting and no tin ball in the welding spots, with sound electric performance. Through Convex Lens 3, infrared rays are gathered and irradiate with concentration. There is no need to block the infrared rays. This invention, compared with current technology, can use Lamp 2 with lower capacity, and melt the solder paste in a short period, saving energy and lowering consumption with higher efficiency.

With concentrated infrared rays and heat, the heating temperature is high and the solder cup of electrical connectors is heated evenly, especially the welding spots on both sides. As the two sides receive sufficient heat of the connectors, no unfavorable tin melting nor tack welding in the welding spots on both sides will be happened.

In addition, with concentrated infrared rays, the rays will not irradiate the non-heating zones in the electrical connectors and the non-heating area in the equipment. It won't happen that the heating zones have insufficient heating and the non-heating zones are undesirably heated.

With the previous preheating and drying steps, the solder paste is heated in this step to be melted rapidly and then cool down fast to form the welding spots, which have not only shining surface, but also fine internal structure. There is little turn-on resistance in the welding spots. Welding spot has sound electric performance and no tack welding occurs.

Thanks to the preheating of solder paste and the concentrated infrared rays, the heating is fast. It will not occur that the conductors of clips and core wires absorb heat fast, while the solder paste absorbs heat slow, and thus the temperature in clips and core wires are so high that they scald the housing and cause insulation in the core wires.

The above is a better execution example of this invention. Any equivalent changes or modification made in accordance with the structure, features and principles stated in the patent application are included in the scope of patent application.

What is claimed is:

1. A welding process for electrical connectors comprising the following steps:
    (1) providing a plurality of solder cups;
    (2) installing each of the electrical connectors in place and placing a cored wire of each electrical connector in each of said corresponding solder cups;
    (3) smearing a solder paste on the inside of each of said solder cups of the electrical connectors;
    (4) setting the electrical connectors and said solder cups on a conveying belt for delivery;
    (5) preheating the solder paste in said solder cups to dry within a temperature range of 60 to 120 Celsius degrees and a preheating period of 5 to 15 seconds;
    (6) delivering said electrical connectors and said solder cups to a heating zone for automatically welding, said heating zone is provided with a welding device comprising focused infrared rays from an IR lamp irradiated toward said solder cups, a soft-metal plated reflector is disposed around said lamp so that the infrared rays from the IR lamp are reflected thereby; and a plurality of elongated convex lens of half elliptic cross-section is set between the IR lamp and the electrical connectors, the distance between the IR lamp and the convex lens is no less than the focal length of the convex lens, the convex lens concentrates infrared rays from the IR lamp into the solder cups of the electrical connectors, thereby the solder pastes are melted evenly free of tin balls and air cavities in the welding spot;

(7) forming welding spots by moving the electrical connectors and said solder cups out of the heating zone, and cooling the solder pastes down to form said welding spots where each cored wire is welded to a corresponding wire connecting terminal.

2. The welding process for electrical connectors according to claim 1, wherein a wave length of the infrared rays from the IR lamp is less than 3 microns, and a temperature range for heating the solder cups is 150 to 250 Celsius degrees, and a heating period is 10 to 30 seconds.

* * * * *